US008677646B2

(12) United States Patent
Conigliaro (10) Patent No.: US 8,677,646 B2
(45) Date of Patent: Mar. 25, 2014

(54) MATTRESS MEASUREMENT DEVICE (76) Inventor: Charles Conigliaro, Stuart, FL (US)

( * ) Notice: Subject to any disclaimer, the term of this patent is extended or adjusted under 35 U.S.C. 154(b) by 197 days.

(21) Appl. No.: 13/302,874

(22) Filed: Nov. 22, 2011

(65) Prior Publication Data

US 2013/0125409 A1    May 23, 2013

(51) Int. Cl.
*G01B 5/18*    (2006.01)
(52) U.S. Cl.
USPC ............................................. 33/833; 33/464
(58) Field of Classification Search
USPC .................................... 33/452, 464, 833, 836
See application file for complete search history.

(56) References Cited

U.S. PATENT DOCUMENTS

| | | | | |
|---|---|---|---|---|
| 1,263,229 | A * | 4/1918 | Gordon | 33/370 |
| 6,662,456 | B1 * | 12/2003 | Triplett | 33/203 |
| D530,639 | S * | 10/2006 | Conigliaro | D10/83 |
| 7,748,132 | B1 * | 7/2010 | Engala | 33/527 |
| 8,276,288 | B1 * | 10/2012 | Yu | 33/512 |
| 2004/0068882 | A1 * | 4/2004 | Nennig | 33/562 |
| 2005/0183281 | A1 * | 8/2005 | Kennedy | 33/833 |
| 2008/0034600 | A1 * | 2/2008 | Rabe | 33/512 |
| 2012/0311880 | A1 * | 12/2012 | Doggett | 33/452 |

* cited by examiner

*Primary Examiner* — G. Bradley Bennett
(74) *Attorney, Agent, or Firm* — McHale & Slavin, P.A.

(57) ABSTRACT

Disclosed is a mattress measuring device for use in the accurate measurement of a sag in a mattress. The measurement device employs the use of telescoping rails, so as to allow for the universal adaptation to various size mattresses, while providing a rigid measuring base that allows for the positioning of a measuring arm that can be placed over the sag for direct measurement of the mattress sag. The use of positioning legs maintains a perpendicular placement of the cross rails, so as to provide subjective measurement of suspected sags.

12 Claims, 7 Drawing Sheets

MATTRESS MEASUREMENT DEVICE

FIELD OF THE INVENTION

This invention relates to mattresses and, more specifically, to a device for measuring the permanent depressions or sagging present on the top surface of a mattress.

BACKGROUND OF THE INVENTION

Sags can appear in even the most expensive and highest quality mattresses. Mattress sags make for uncomfortable sleeping experiences, and can also contribute to back and neck pain from spinal misalignment. Sags and rolling are often the result of sleeping in the same spot on the mattress, which, over time, causes various issues such as coil compression, padding compression and covering material stretch. Mattress sags may also be caused by providing poor support to the mattress itself, such as when an improper slat support or improper box spring is utilized to support the mattress during use. Yet another cause of mattress sag is poor workmanship and inferior materials which may fail prematurely to the expected life of the mattress.

When a mattress is used, it tends to compress in the areas that are subjected to the greatest amount of weight. Over time the compression may become permanent, resulting in depressions or sags in the sleeping surface. The volume of the mattress sag can vary, but typically manifests itself as a shallow, paraboloid shape; or alternatively, the top of the mattress will have a degradation in firmness. In any event, a sagging mattress can be the source of numerous ailments, both physical and psychological to the user. The purchase of a new mattress and box spring does not automatically remedy this situation, since there are many instances where the quality is lacking. Further, in some instances, reputable manufacturers may obtain materials that have latent defects, and not until someone actually uses the mattress would such a defect be uncovered.

The problem to be addressed provides a device that allows for an objective measurement of sagging mattresses that are both new or worn, for determination if the mattress should be replaced. In many instances, a well worn mattress may not appear to be overly worn, but proper measurement could certainly notify the consumer or the manufacturer, in the case of warranty, that the mattress is unacceptably sagging, and should be replaced. Of a greater concern are new mattresses that the consumer has invested in the purchase thereof, that immediately provide unacceptable sagging. Such sagging, again, may be the result of improper manufacturing and/or poor quality components; alternatively, the sagging mattress may be captured in the mind of the consumer when the consumer is subject to a change in their sleeping habits due to a different mattress feel. This can result in a psychological belief that the mattress is sagging, when in fact it has more support than the previous mattress used by the consumer that simply has a different comfort level. Mattress sagging can be most problematic with the consumer, and unless they are evidenced quickly that sagging is not the issue, the consumer may dwell on the matter and develop physiological ailments that have nothing to do with the mattress, but rather a result of or some misgivings about the mattress. In many instances, it has been found that the mattress is not sagging, but rather the consumer is having buyer's remorse due to an expenditure made and seeks refund or replacement of the mattress. Replacement of a mattress can be expensive to the manufacturer, but it is not proper to resell once a mattress has been used and claimed to be defective, wherein the mattress must then be shipped back to the manufacturer, the cost of which escalates due to shipping, storage and manpower employed.

For this reason, what is needed in the industry is a simple measuring device that provides an objective determination of mattress sagging or defection, that will allow the consumer to participate in analyzing the sag to determine if replacement of the mattress is necessary.

SUMMARY OF THE INVENTION

The instant invention is a mattress measuring device that can be used on any size mattress. The measuring device employs the use of cross and side rails that can be telescoped to meet the particular width or length of a mattress, such as full, queen, king, California king and so forth. The construction of the telescoping central and side rails are such that when extended a singular straight edge is maintained for contact with the upper surface or upper peak surfaces of the mattress. On the distal end of each side rail is a positioning arm that, by the use of gravity, maintains the cross and side rails in a substantially vertical position when placed on top of the mattress while also centering the device over the mattress surface. A measuring arm can then be positioned along a desired rail over the suspected sag, and a direct measurement can be made from the distal end of the measuring arm to a surface of the rail to obtain a subjective determination of the depth of the sag. The use of the collapsible or pivoting arms allows for ease of storage, wherein side rails can be collapsed over the central cross rail. The positioning arms are pivotally secured to the side rails and may be rotated in a pivotal manner to align with the side rails. The measuring arm may also be rotated to align with the cross rail, wherein all components will consume not much more storage space than a conventional yardstick.

An objective of the present invention is to provide a mattress measuring device that can provide a subjective determination of mattress sags by the use of a measuring arm that can be consistently repositioned by use of pivoting arms placed on the outboard sides of a mattress.

Still another objective of the present invention is to provide a low cost mattress measuring device that is user friendly.

Another objective of the present invention is to provide a mattress measuring device that is easy to manufacture and assemble.

Yet another objective of the present invention is to provide a mattress measuring device that can be collapsed to a compact state.

Still yet another objective of the present invention is to provide a mattress measuring device that can be operated by a single operator without tools or excessive strength.

Other objects and advantages of this invention will become apparent from the following description taken in conjunction with any accompanying drawings wherein are set forth, by way of illustration and example, certain embodiments of this invention. Any drawings contained herein constitute a part of this specification and include exemplary embodiments of the present invention and illustrate various objects and features thereof.

DETAILED DESCRIPTION OF THE DRAWINGS

Now referring generally to the figures, one embodiment of the mattress measuring device 10 of the instant invention is illustrated. The mattress measuring device generally includes a cross rail 12 formed from a generally rigid material, preferably having a substantially rectangular shape. The cross rail is provided with a first end 18 and a second end 20, each respective end being provided with a slot 21 extending generally along the longitudinal centerline of the cross rail. The cross rail 12 includes a front surface 14 with positioning indicia 16 placed thereon. A first side rail 22 is formed similar to the cross rail having a substantially rigid material construction, with a substantially rectangular shape in a centrally disposed longitudinal slot 24. The side rail 22 has an inner fastener 26, which is slideably secured to the cross rail slot 21. The cross rail 12 includes an outer fastener 28 that is slideably secured to the first side rail slot 24, allowing the first side rail and cross rail to move with respect to each other in a telescoping manner. Similarly, a second side rail 30 having the same general shape as the first side rail 22 and including a slot 32 longitudinally disposed therein, the second side rail similarly has an inner fastener 34 slideably secured to the cross rail slot 21. The cross rail 12 includes a second outer fastener 36 which is slideably secured to slot 32 of the second side rail. It should be noted that the first and second side rails 22, 30 can move in a telescoping manner with respect to the cross rail 12 while the fasteners and slots are constructed and arranged to maintain the side rails in a parallel configuration to the cross rail throughout the extension. It should be noted that while the preferred embodiment utilizes substantially rectangular components, other suitable shapes that permit telescoping movement between the components while preventing substantial rotation between the components may be utilized without departing from the scope of the invention. The shapes may include, but should not be limited to, interfitting components and components with built in slides, ways or gibs.

A first positioning leg 40 is pivotally attached along an upper end 42 to an outer end 44 of the first side rail. Similarly, a second positioning leg 46 is pivotally secured by fastener 48 along end 50 to the outward end 52 of the second side rail. The fasteners and the shape of the positioning legs provide the ability to pivot the positioning leg between a storage position that is substantially parallel to the cross rail and a functioning position that is substantially perpendicular with respect to the cross rail. In at least one embodiment, the distal ends of the positioning legs have sufficient weight to cause the measuring tool to position itself in a substantially vertical position for use when positioned in the functioning position.

The measuring arm 60 is slideably secured to the cross rail 12 by fastener 62. The measuring arm 60 includes a slot 64 centrally disposed so as to allow the measuring arm to move vertically in relation to the cross rail 12. In operation, the measuring arm has measuring indicia 66 which may be in English, metric or any other suitable format placed along surface of measuring arm, and allows for direct measurement of a sag that depends beneath the lower edge 70 of the cross rail 12.

Figure 1:
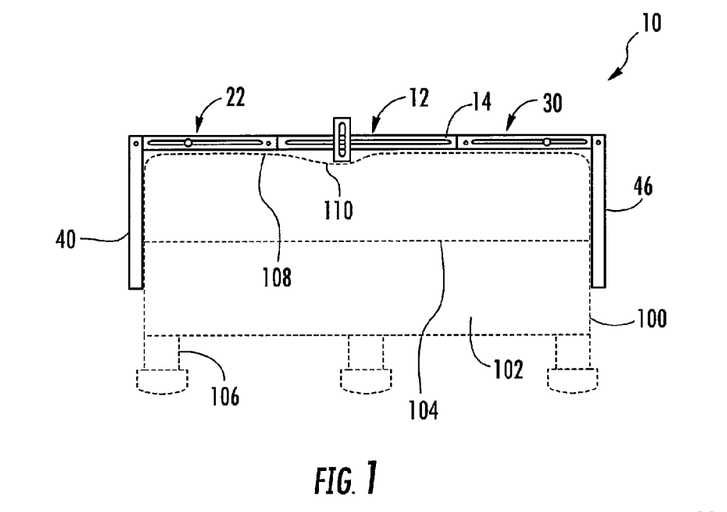
FIG. 1 is a front view of one embodiment of the present invention, illustrating operation of the device over a mattress.
Figure 2:
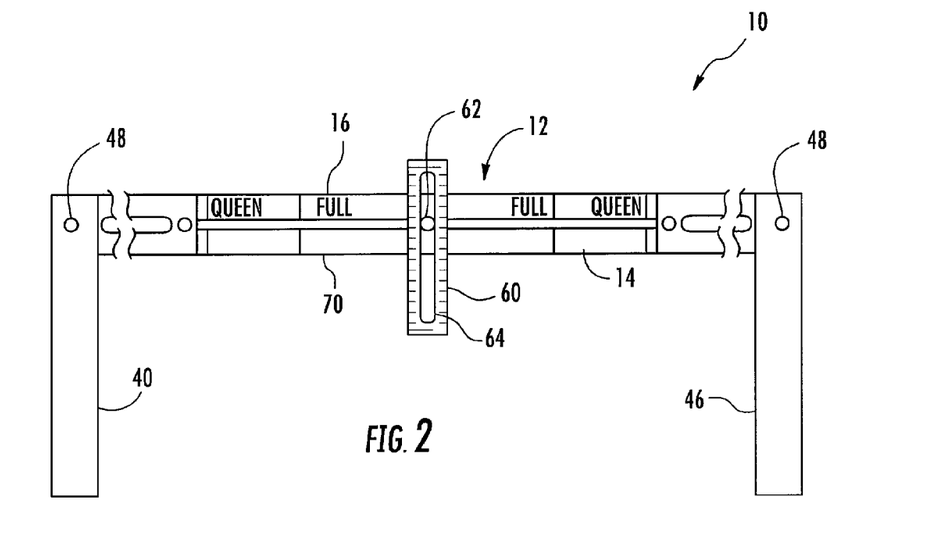
FIG. 2 is a front view of the mattress measuring device.
Figure 3:
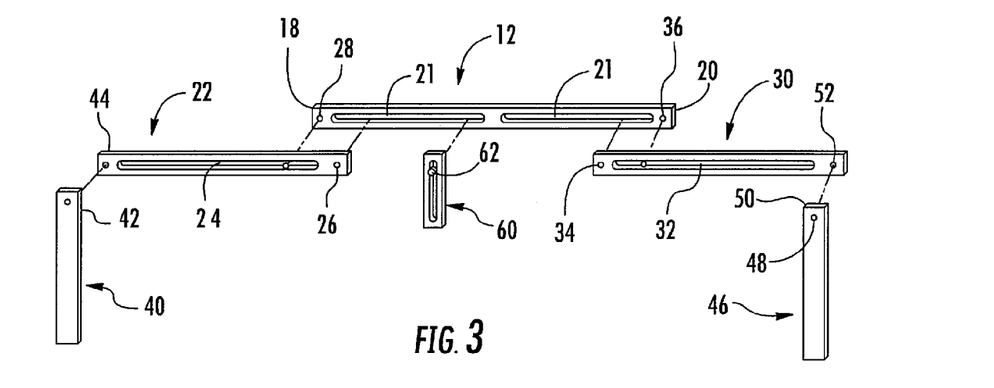
FIG. 3 is an exploded view of the mattress measuring device of the instant invention.
Figure 4:
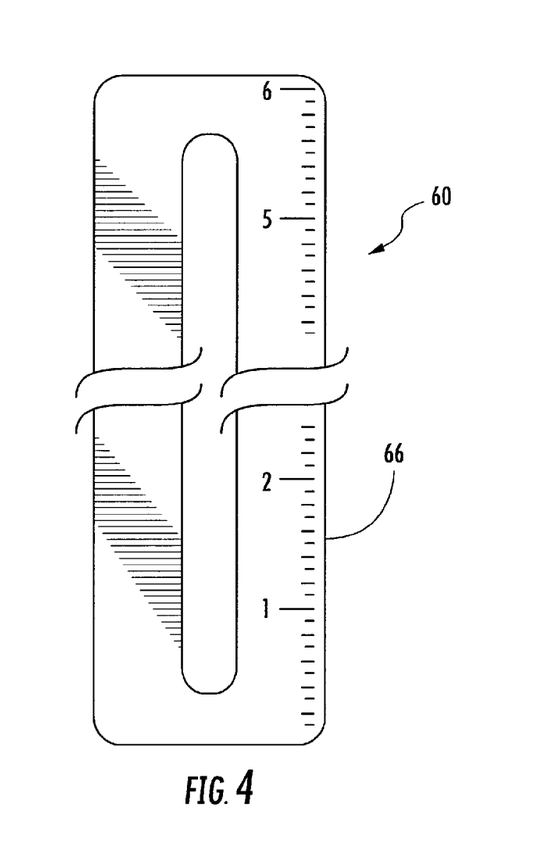
FIG. 4 is an enlarged view of the measuring arm.
Figure 5:
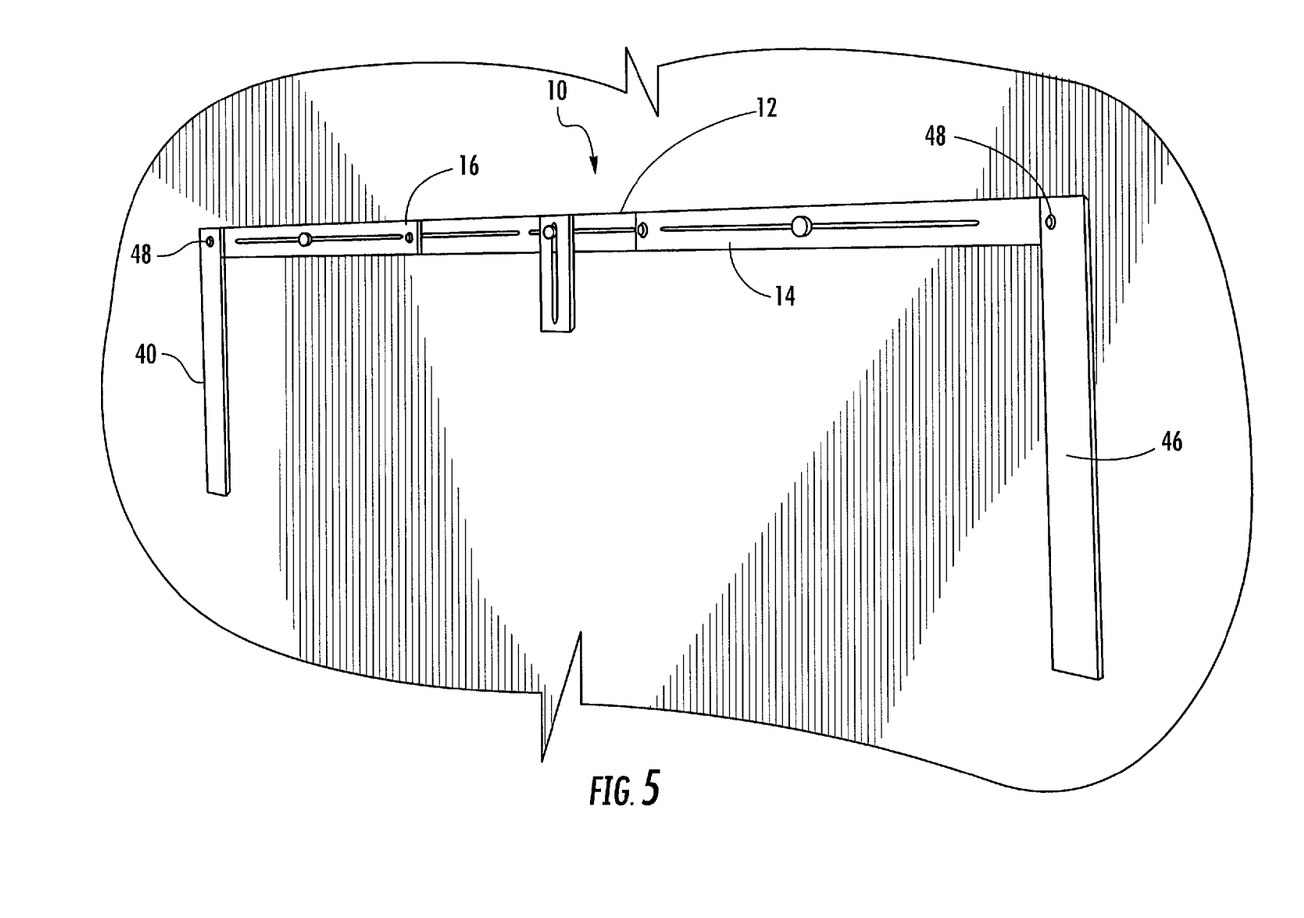
FIG. 5 is a perspective view of one embodiment of the mattress measuring device of the present invention.
Figure 6:
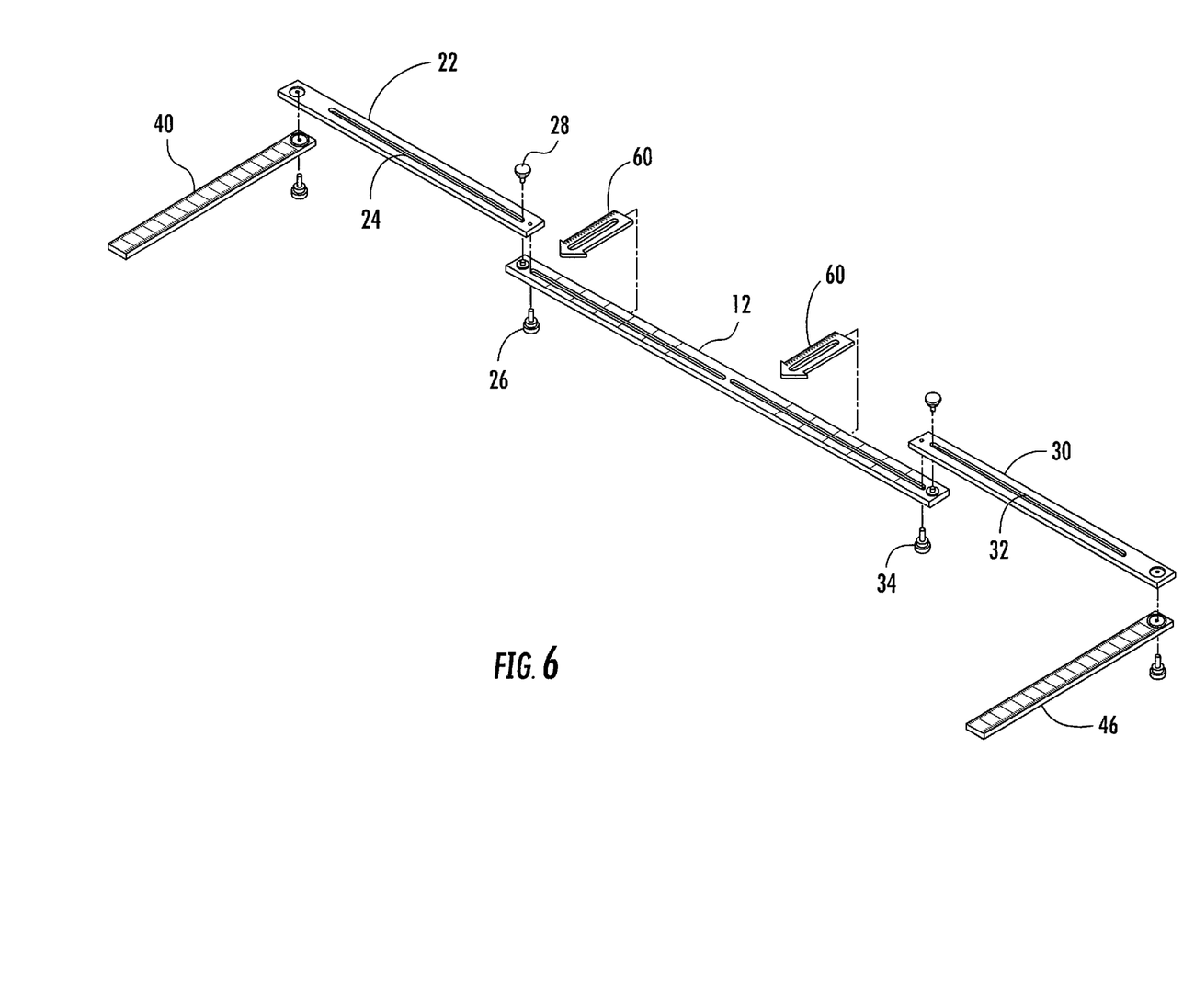
FIG. 6 is an exploded perspective view of one embodiment of the present invention.
Figure 7:
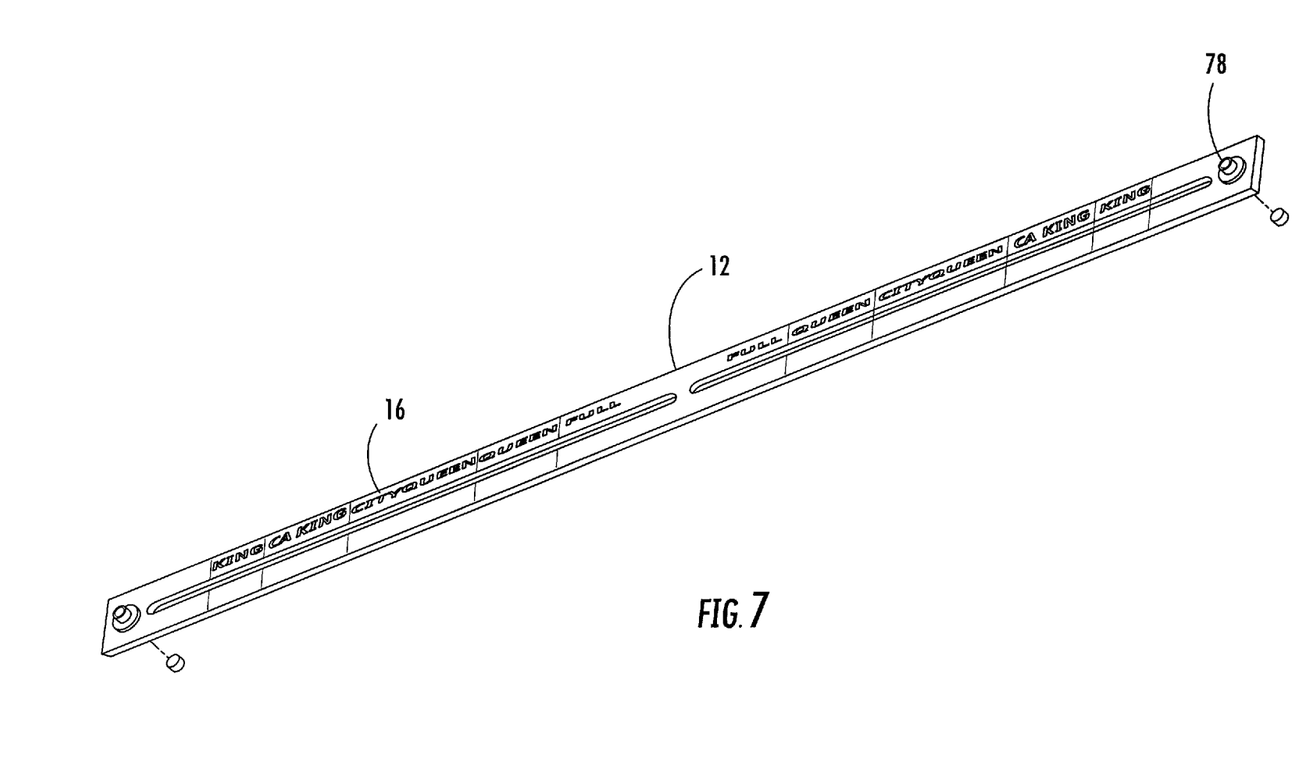
FIG. 7 is a perspective view of one embodiment of the cross rail of the present invention.
Figure 8A:
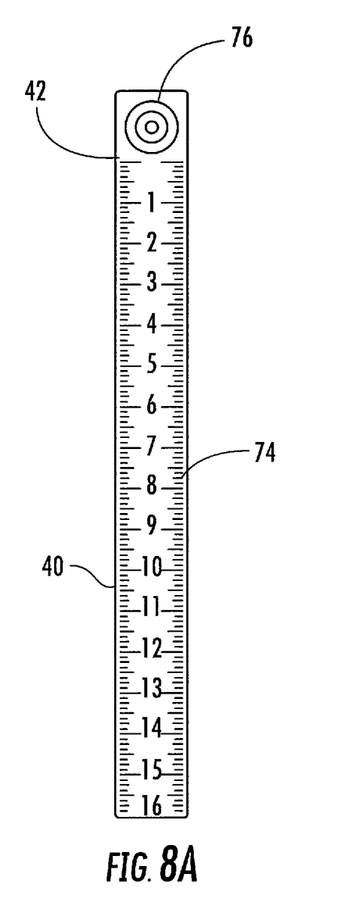
FIG. 8A is a front view of one embodiment of the positioning leg of the present invention.
Figure 8B:
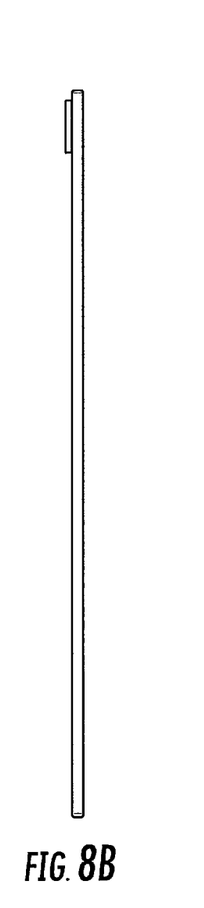
FIG. 8B is a right side view of the positioning leg illustrated in FIG. 8A.
Figure 8C:
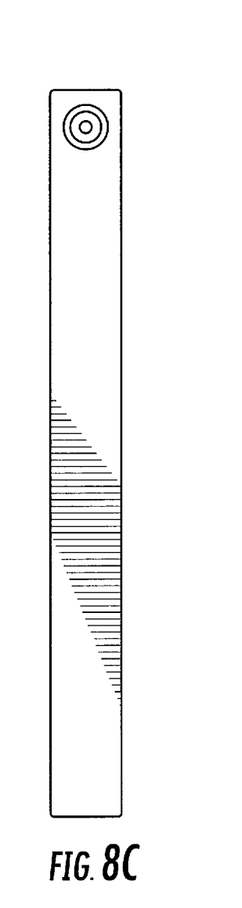
FIG. 8C is a rear view of the positioning leg illustrated in FIG. 8A.
Figure 9:
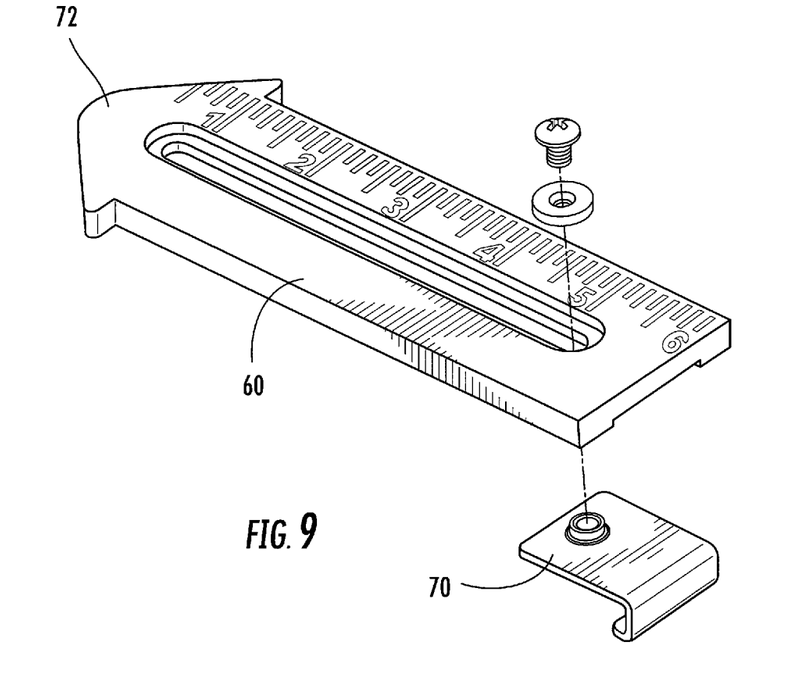
FIG. 9 is a perspective view of one embodiment of the measuring arm of the present invention.

Referring to FIG. 1, operation of the mattress measuring device is illustrated. Set forth is a conventional queen size mattress assembly 100, comprising a box spring 102, and mattress 104. The box spring is maintained off the floor by the use of a bed frame 106. In this figure, the top surface 108 of the mattress 104 includes an identified sag 110. In operation, the first and second side rails are telescoped from the cross rail 12 to accommodate the size of the mattress. The positioning indicia placed along the front surface of the cross rail assists the user in adjustment to the particular size of mattress. The positioning legs 40 and 46 are rotated to the functioning position and placed on the side surfaces of the mattress 104 so as to hang in a vertical position over each side. It should be noted that the cantilever weight of any style positioning leg will cause the leg to fall into a substantially vertical position. Once in position, the side rails and cross rail are now positioned perpendicular to the top surface of the mattress, so as to provide an upright platform that allows for ease of movement of the measuring arm 60, and to allow for direct measurement of the sag in relation to the measurement indicia 66. The mattress measuring device 10 may be placed at several locations along the length of the mattress as desired to take multiple measurements.

When the measurement is complete, positioning legs 40 and 46 may be folded over the side rails 22 and 30, respectively, which can further be collapsed by sliding the fasteners 26 and 34 along cross rail 12 to provide a compact assembly. Further, measuring arm 60 may be rotated by fastener 62 to be placed in parallel with the rails, wherein the stored assembly can be approximate the size of a yardstick. In the preferred embodiment, the mattress measuring device is made from a light material such as, but not limited to, plastic to provide a lightweight and inexpensive measuring device. It should be noted that extrusions made from metal or polymers alike may be utilized for construction without departing from the scope of the present invention.

Referring to FIGS. 6-9 an alternative embodiment of the mattress measuring device is illustrated. In this embodiment, the cross rail 12 is provided with two measuring arms 60. The two measuring arms allow both sides of a mattress to be inspected at once. Also in this embodiment, the measuring arms 60 are provided with a hook member 70. The hook member is constructed and arranged to cooperate with an upper surface of the cross rail 12 or side rails 22, 30 to allow the measuring arm to be easily placed onto or removed from the rail(s). This construction allows a user to add or delete as many measuring arms as necessary for measuring a particular mattress. The construction also provide for compact storage when not in use. The hook member 70 is also removable and replaceable to the measuring arm. This construction facilitates replacement of the hook should it become damaged or alternatively allows the measuring arm to be directly connected to the cross rail if desired. The measuring arm in this embodiment is also provided with a pointed tip 72. The pointed tip provides the user the ability to measure more points across a sag to provide a precise cross section of the measurements. FIGS. 8A through 8C illustrate an alternative embodiment of the positioning leg. This embodiment is provided with indicia 74 which allow additional measurements of the mattress to be taken. In particular, the edges of the mattress may have a dip or sag that is not within reach of the measuring arm. In this case the measurement of the dip or sag may be directly read from the indicia on the positioning arm. This embodiment also includes a positioning ratchet 76 which cooperates with locating pins 78 to provide multi-position stops for positioning the positioning arm with respect to the cross rail. The positioning ratchet provides tactile clicks as well as positions of resistance allow the user to easily position the positioning arm perpendicular with respect to the cross rail. The positions of resistance allow the user to utilize the device without fear that the positioning arm is not perpendicular to the cross rail and also allows the user to easily, by overcoming the resistance, to fold the device into its storage position.

All patents and publications mentioned in this specification are indicative of the levels of those skilled in the art to which the invention pertains. All patents and publications are herein incorporated by reference to the same extent as if each individual publication was specifically and individually indicated to be incorporated by reference.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A mattress measuring device comprising:
   a cross rail having sufficient length to reach to at least partially across the top surface of a mattress;
   a first side rail, a first end of said first side rail secured to a first end of said cross rail for extendable movement therebetween;
   a first positioning leg secured to a second end of said first side rail for placement along a side surface of said mattress;
   a measuring arm mounted for traversal across said cross rail and mounted for sliding movement between said cross rail and an upper surface of said mattress, whereby said measuring arm may be traversed to a desired location across said top surface of said mattress and whereby said measuring arm may be slid toward said top surface to extend between said cross rail and top surface of said mattress, said measuring arm including indicia thereon for providing a measurement between said cross rail and top surface, whereby sags located on said top surface of said mattress may be measured.

2. The mattress measuring device of claim 1 wherein said extendable movement between said cross rail and said first slide rail is telescoping.

3. The mattress measuring device of claim 1 wherein said cross rail includes a first elongated slot, a first fixed fastener positioned distally to said elongated slot, said first end of said first side rail including a fixed fastener positioned distally with respect to an elongated first said side rail slot, said first side rail fixed fastener cooperating with said first elongated slot of said cross rail, said fixed fastener of said cross rail cooperating with said first elongated rail slot to provide said extendable movement therebetween.

4. The mattress measuring device of claim 1 wherein said first end of said first positioning arm is pivotally secured to said second end of said first slide rail for movement between a storage position that is substantially parallel with respect to said cross rail and a functioning position that is substantially perpendicular with respect to said cross rail.

5. The mattress measuring device of claim 4 wherein said positioning arm includes a second end, said second end including sufficient weight to cause said mattress measuring device to assume a substantially vertical position upon placement onto said top surface of said mattress.

6. The mattress measuring device of claim 3 wherein said measuring arm includes a central elongated slot therein, said central elongated slot positioned to cooperate with said first elongated slot of said cross rail, whereby said first elongated slot may be utilized to traverse said measuring arm across said cross rail and wherein said central slot of said measuring arm may be utilized to slide said measuring arm toward said top surface of said mattress.

7. The mattress measuring device of claim 1 wherein said cross rail includes a second side rail, a first end of said second side rail secured to a second end of said cross rail for extendable movement therebetween.

8. The mattress measuring device of claim 1 wherein a first end of a second positioning arm is secured to a second end of said second side rail.

9. The mattress measuring device of claim 8 wherein said cross rail includes a second elongated slot, a second fixed fastener positioned distally to said second elongated slot, said first end of said second side rail including a fixed fastener positioned distally with respect to an elongated second side rail slot, said second side rail fixed fastener cooperating with said second elongated slot of said cross rail, said second fixed fastener of said cross rail cooperating with said elongated second side rail slot to provide said extendable movement therebetween.

10. The mattress measuring device of claim 7 wherein a first end of a second positioning arm is pivotally secured to said second end of said second slide rail for movement between a storage position that is substantially parallel with respect to said cross rail and a functioning position that is substantially perpendicular with respect to said cross rail.

11. The mattress measuring device of claim 10 wherein said positioning arm includes a second end, said second end including sufficient weight to cause said mattress measuring device to assume a substantially vertical position upon placement onto said top surface of said mattress.

12. A mattress measuring device comprising:
    a cross rail formed from a substantially rigid material having a substantially rectangular shape, said cross rail having a front surface with positioning indicia placed thereon in a centrally disposed longitudinal slot;
    The first and second side rail formed from a substantially rigid material having a substantially rectangular shape, with a centrally disposed longitude on slot, each said side rail having an inner fastener slide ably secured to said cross rail slot; said cross rail having a first outer fastener slide ably secured to said first side rail slot, and a second outer fastener slide ably secured to said second side rail slot, said fasteners allowing said first and second slide rails to telescope in respect to said cross rail; in measuring them, slide ably secured to said cross rail, said measuring arm having measurement indicia placed thereon; and a first and second positioning leg pivotally secured to an outer edge of each side rail; wherein said positioning legs are placed on the outboard side of a mattress, allowing a lower edge of said rails to engage in upper surface of the mattress, whereby measuring on its position over a suspected sag for measuring the depth of a sag.

* * * * *